United States Patent
Ukai et al.

(10) Patent No.: US 7,399,328 B2
(45) Date of Patent: Jul. 15, 2008

(54) HYDROGEN GAS STATION, FUEL CELL SYSTEM, AND HYDROGEN GAS RATE ACCOUNTING DEVICE

(75) Inventors: Kunihiro Ukai, Nara (JP); Kiyoshi Taguchi, Osaka (JP); Hidenobu Wakita, Kyoto (JP); Seiji Fujihara, Hyogo (JP); Yukimune Kani, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 692 days.

(21) Appl. No.: 10/974,275

(22) Filed: Oct. 27, 2004

(65) Prior Publication Data
US 2005/0115150 A1    Jun. 2, 2005

(30) Foreign Application Priority Data
Oct. 30, 2003    (JP)    ............... 2003-370378

(51) Int. Cl.
*F17D 3/00*    (2006.01)
*B01J 7/00*    (2006.01)
*B01J 19/00*    (2006.01)
*C10B 1/00*    (2006.01)
*F01N 3/28*    (2006.01)
*H01M 8/04*    (2006.01)

(52) U.S. Cl. ............... 48/191; 48/61; 48/89; 48/174; 422/107; 422/108; 422/112; 429/17; 429/25

(58) Field of Classification Search ............... 48/61, 48/89, 174, 191; 422/107, 108, 112; 429/17, 429/25
See application file for complete search history.

(56) References Cited

U.S. PATENT DOCUMENTS
4,098,960 A * 7/1978 Gagnon ............... 429/25

FOREIGN PATENT DOCUMENTS

| JP | 7-057756 A | 3/1995 |
| JP | 2002-274801 A | 9/2002 |
| JP | 2002-372199 | * 12/2002 |
| JP | 2002-372199 A | 12/2002 |

OTHER PUBLICATIONS

Translation of the Foreign Patent Document: Nishizaki et al. (JP 2002-372199).*

* cited by examiner

*Primary Examiner*—Walter D. Griffin
*Assistant Examiner*—Lessanework T Seifu
(74) *Attorney, Agent, or Firm*—Panitch Schwarze Belisario & Nadel LLP

(57) ABSTRACT

A hydrogen gas station is disclosed comprising, a reformer configured to generate a hydrogen-rich reformed gas through reforming reaction of an organic compound, a gas supply port configured to communicate with a gas supply pipe to supply the reformed gas to a plurality of fuel cells, and a gas recovery port configured to communicate with a gas recovery pipe to receive an off gas containing hydrogen unconsumed from the fuel cells, the hydrogen gas station being configured to consume the off gas.

24 Claims, 7 Drawing Sheets

HYDROGEN GAS STATION, FUEL CELL SYSTEM, AND HYDROGEN GAS RATE ACCOUNTING DEVICE

BACKGROUND OF THE INVENTION

1. Field of the Invention

The present invention relates to a hydrogen gas station, a fuel cell system, and a hydrogen gas rate accounting device. More particularly, the present invention relates to a fuel cell system comprising a hydrogen gas station configured to generate a hydrogen-rich reformed gas through reforming reaction of an organic compound, and a plurality of fuel cells configured to consume the reformed gas to generate electric power.

2. Description of the Related Art

A fuel cell configured to generate electric power and heat from hydrogen as a fuel is capable of converting fuel energy into effective electric energy and heat energy with high conversion efficiency. For this reason, a fuel cell system is capable of inhibiting the amount of emission of carbon dioxide because of the high conversion efficiency, and is therefore expected to reduce the carbon dioxide which may be a cause of global warming.

In actuality, however, infrastructures of the supply system of hydrogen used as the fuel for the fuel cell are not adequately equipped. The fuel cell is typically equipped with a reformer capable of generating hydrogen from a feed gas supplied from the existing infrastructure, such as a city gas (see Japanese Laid-Open Patent Application Publication No. Hei. 07-57756 (first prior art)).

In addition, for the purpose of stable and efficient supply of hydrogen, a technology has been developed, in which a feed gas capable of being easily separated into hydrogen is equipped as an infrastructure, and the separated feed gas is recovered and re-used (see Japanese Laid-Open Patent Application Publication No. 2002-274801 (second prior art)).

Further, as a system for supplying hydrogen to areas, there has been proposed a hydrogen supply system including a reformer, hydrogen consumption equipment and hydrogen storage means which are networked. In this system, hydrogen can be supplied to the hydrogen consumption equipment sufficiently and efficiently (see Japanese Laid-Open Patent Application Publication No. 2002-372199 (third prior art)).

Assuming that the fuel cell system of the first prior art is employed as, for example, a home fuel cell system, the operation of the reformer equipped in the fuel cell is controlled to generate hydrogen in varying amount according to constantly varying amount of electric power or heat which the fuel cell is required to generate.

Typically, the reforming reaction (endothermic reaction) for generating hydrogen in the reformer is carried out at a high temperature of approximately 700° C. The change of operating conditions (e.g., temperature) of the reformer depending on the constant variation in the amount of hydrogen required causes a substantial heat loss, thereby resulting in reduction of hydrogen generation efficiency in the reformer. For example, if the temperature of the reformer is lowered to a room temperature and then increased up to 700° C., such a temperature increasing operation may cause substantial start energy loss and time loss.

In other words, the fuel cell system of the first prior art is undesirable to the home fuel cell system which is required to constantly vary the amount of electric power, because of difficulty in improving energy utilization efficiency of the reformer equipped in the fuel cell system.

In contrast to the fuel cell system of the first prior art, due to the use of the feed gas capable of being easily separated into hydrogen, the hydrogen storage and supply system of the second prior art is capable of dealing with a load fluctuation in electric power at home, although it is necessary to recover the feed gas from which hydrogen has been removed.

In the hydrogen supply system of the third prior art, the reformer, a number of hydrogen consumption equipment (e.g., fuel cells), and the hydrogen storage means are interconnected and networked to allow hydrogen communication. In this system, the variation in demands for hydrogen among this hydrogen consumption equipment can be mutually offset, and the demands for hydrogen are equalized in the entire fuel cell system. As a result, the amounts of gases supplied to this hydrogen consumption equipment are equalized. So, the hydrogen supply system of the third prior art is expected to resolve a problem of reduction of the hydrogen generation efficiency which may take place in the fuel cell system of the first prior art by keeping the operating conditions of the reformer.

By the way, part of hydrogen supplied to an anode of the fuel cell through a fuel gas inlet of the fuel cell is not consumed in the anode and is exhausted as an off gas from a fuel gas outlet of the fuel cell together with steam or carbon dioxide. The exhausted off gas has predetermined heat energy and is hence useful as a heat source. The efficient use of the off gas has been desired for the purpose of improvement of energy efficiency of the entire fuel cell system.

However, the efficient use of the off gas exhausted from the anode of the fuel cell and its recovery method are not achieved in the hydrogen supply system of the third prior art.

In addition, in the fuel cell system of the second prior art, recovery of the off gas using hydrogen absorbing alloy is suggested, but the efficient use of the off gas is not achieved as in the hydrogen supply system of the third prior art.

SUMMARY OF THE INVENTION

The present invention has been developed under the circumstances, and an object of the present invention is to provide a hydrogen gas station and a fuel cell system which are configured to recover an off gas containing hydrogen unconsumed in a plurality of fuel cells and exhausted from fuel gas outlets of the plurality of fuel cells to efficiently utilize the off gas.

Another object of the present invention is to provide a hydrogen gas rate accounting device capable of appropriately carrying out hydrogen gas rate accounting by estimating value of the off gas exhausted from the fuel gas outlets of the plurality of fuel cells.

According to one aspect of the present invention, there is provided a hydrogen gas station comprising a reformer configured to generate a hydrogen-rich reformed gas through reforming reaction of an organic compound; a gas supply port configured to communicate with a gas supply pipe to supply the reformed gas to a plurality of fuel cells; and a gas recovery port configured to communicate with a gas recovery pipe to receive an off gas containing hydrogen unconsumed from the fuel cells, the hydrogen gas station being configured to consume the off gas.

According to another aspect of the present invention, there is provided a fuel cell system comprising a hydrogen gas station configured to generate a hydrogen-rich reformed gas through reforming reaction of an organic compound; a plurality of fuel cells each of which is configured to generate electric power using the reformed gas supplied from the hydrogen gas station; a gas supply pipe through which the reformed gas is guided from the hydrogen gas station to the fuel cells; and a gas recovery pipe through which an off gas containing hydrogen unconsumed from the fuel cells is guided to the hydrogen gas station.

In such a construction, the off gas containing hydrogen unconsumed after the power generation reaction in each fuel cell and exhausted from the anode of the fuel cell can be recovered and efficiently used.

The fuel cell system may further comprise: a double-walled pipe comprised of a tubular inner pipe and a tubular outer pipe enclosing the inner pipe, wherein one of the inner pipe and the outer pipe may form the gas supply pipe and the other of the inner pipe and the outer pipe may form the gas recovery pipe.

Thereby, it is possible to avoid negative effect on piping drawing which may be caused by the presence of two kinds of pipes, i.e., the supply pipe and the recovery pipe in each gas consumption equipment.

The inner pipe may form the gas recovery pipe and the outer pipe may form the gas supply pipe.

In this construction, it is possible to heat the reformed gas sent to the fuel gas inlet of the fuel cell through the tubular space between the inner pipe and the outer pipe by heat exchange with the off gas exhausted from the fuel gas outlet of the fuel cell through the inner space of the inner pipe, and to inhibit heat radiation from the off gas by the presence of the reformed gas flowing around the off gas.

The fuel cell system may further comprise a reformed gas storage portion provided in the gas supply pipe and configured to store the reformed gas supplied from the hydrogen gas station. The fuel cell system may further comprise an off gas storage portion provided in the gas recovery pipe and configured to store the off gas exhausted from the fuel cells.

In this construction, since it is possible to stably supply the reformed gas and stably recover the off gas according to the power generation amount of each fuel cell, convenience of the distributed fuel cell system is improved and operation efficiency thereof is improved.

The hydrogen gas station may include a first combustor configured to supply heat required for the reforming reaction, and the first combustor may be configured to combust the off gas to generate the heat. Also, the fuel cell system may further comprise: a second combustor connected to each of the fuel cells, and may be configured to combust the off gas from each of the fuel cells.

In this construction, the first combustor combusts the off gas to generate a combustion gas used as a heat source supplied to the reforming catalyst body of the reformer. Thus, the off gas can be efficiently used as the fuel source. In addition, the second combustor may combust the off gas to generate a combustion gas as a heat source used for heating hot water in a hot water tank equipped for the fuel cell. Thus, the off gas is efficiently utilized as the fuel source.

The fuel cell system may further comprise: a first pressure increasing device provided in the gas recovery pipe and configured to adjust a gas pressure of the off gas in the gas recovery pipe, or a second pressure increasing device provided in the gas supply pipe and configured to adjust a gas pressure of the off gas in the gas supply pipe.

The first or second pressure increasing device appropriately increases the gas pressure of the off gas according to a pressure loss of the off gas even when the pipe through which the off gas flows is long.

The fuel cell system may further comprise: a condenser provided on downstream side of an off gas outlet of each of the fuel cells in a flow of the off gas and configured to condense steam contained in the off gas.

This makes it possible to inhibit formation of the water droplets from the steam contained in the off gas in the gas recovery pipe, which may clog the gas recovery pipe.

Specifically, the gas recovery pipe may be comprised of a plurality of gas recovery sub-pipes respectively connected to the fuel cells, and a gas recovery main pipe into which the gas recovery sub-pipes are collected, the gas recovery main pipe being connected to the hydrogen gas station.

Suitably, such a construction can reduce the complexity of the recovery pipe system, irrespective of an increase in the number of fuel cells connected to the gas recovery main pipe.

The fuel cell system may further comprise: an anti-backflow device provided in at least one of the gas recovery sub-pipe and the gas recovery main pipe and configured to inhibit back flow of the off gas. For example, the anti-backflow device may be a one-way valve.

The anti-backflow device can inhibit the back flow of the off gas to the fuel cell.

The fuel cell system may further comprise: a first pressure sensor provided in the gas recovery sub-pipe and configured to measure a gas pressure of the off gas in the gas recovery sub-pipe.

The first pressure sensor appropriately monitors the gas pressure of the off gas.

The fuel cell system may further comprise: a first pressure increasing device provided in the gas recovery sub-pipe and configured to adjust a gas pressure of the off gas in the gas recovery sub-pipe, the first pressure increasing device being configured to adjust a value of the gas pressure obtained from the first pressure sensor to a predetermined value.

Since the gas pressure of the off gas is monitored and adjusted to a proper set value, the back flow of the off gas can be reliably inhibited, for example.

The fuel cell system may further comprise: a second pressure sensor provided in the gas recovery main pipe and configured to measure a gas pressure of the off gas in the gas recovery main pipe, the first pressure increasing device being configured to adjust a differential pressure between the value of the gas pressure obtained from the first pressure sensor and a value of the gas pressure obtained from the second pressure sensor to a predetermined value.

Since the gas pressure of the off gas is monitored and adjusted to a proper set value based on the differential pressure, the back flow of the off gas can be reliably inhibited, for example.

The fuel cell system may further comprise a gas pipe valve provided in the gas recovery sub-pipe and configured to open and close the gas recovery sub-pipe, the gas pipe valve being configured to be closed when the value of the gas pressure obtained from the first pressure sensor is not more than the predetermined value.

By closing the gas pipe valve in response to an unpredictable situation, for example, gas pressure deficiency of the off gas, the back flow of the off gas to the fuel cell can be reliably inhibited, for example.

The fuel cell system may further comprise: a second combustor connected to each of the fuel cells, and configured to combust the off gas when the gas pipe valve is closed.

Since the second combustor can treat the off gas even when the gas pipe valve is closed, the reformed gas can continue to be supplied from the hydrogen gas station to the fuel cell.

The fuel cell system may further comprise: an oxidizing gas sensor provided in the gas recovery sub-pipe and configured to measure a concentration of the oxidizing gas contained in the off gas in the gas recovery sub-pipe.

The oxidizing gas sensor can immediately and reliably detect the oxidizing gas mixed in the off gas.

The fuel cell system may further comprise: a gas pipe valve provided in the gas recovery sub-pipe and configured to open and close the gas recovery sub-pipe, the gas pipe gas pipe valve being configured to be closed when the oxidizing gas sensor detects an oxidizing gas having a predetermined concentration or higher. Also, an operation of the fuel cell may be stopped when the oxidizing gas sensor detects the oxidizing gas having the predetermined concentration or higher.

Thereby, it is possible to avoid abnormal combustion in the gas recovery sub-pipe which may be caused by mixing of the off gas (hydrogen) and the oxidizing gas.

The fuel cell system may further comprise: a first flow rate sensor provided in the gas supply pipe and configured to measure a flow rate of the reformed gas flowing in the gas supply pipe; a second flow rate sensor provided in the gas recovery pipe and configured to measure a flow rate of the off gas flowing in the gas recovery pipe; and a processor, wherein the processor may be configured to calculate an amount of hydrogen consumption in each of the fuel cells based on the flow rate of the reformed gas measured by the first flow rate sensor and the flow rate of the off gas measured by the second flow rate sensor.

The fuel cell system may further comprise a first flow rate sensor provided in the gas supply pipe and configured to measure a flow rate of the reformed gas flowing in the gas supply pipe; and a processor, wherein the processor may be configured to calculate an amount of hydrogen consumption in each of the fuel cells based on the flow rate of the reformed gas measured by the first flow rate sensor and power generation conditions of the fuel cell.

In this manner, the processor can carry out hydrogen gas rate accounting based on the above amount of hydrogen consumption.

With the above construction, since the value of the off gas which is the fuel source is properly estimated, a correct amount of hydrogen consumption in the fuel cell is calculated.

According to another aspect of the present invention, there is provided a hydrogen gas rate accounting device comprising a first flow rate sensor configured to, for each of a plurality of fuel cells, measure a flow rate of a hydrogen-rich reformed gas generated in a hydrogen gas station and supplied to the plurality of fuel cells; and a second flow rate sensor configured to, for each of the fuel cells, measure a flow rate of an off gas containing hydrogen unconsumed in each of the fuel cells; and a processor, wherein the processor may be configured to calculate an amount of hydrogen consumption in each of the fuel cells based on the flow rate of the reformed gas measured by the first flow rate sensor and the flow rate of the off gas measured by the second flow rate sensor, and to carry out hydrogen gas rate accounting based on the amount of hydrogen consumption.

According to another aspect of the present invention, there is provided a hydrogen gas rate accounting device comprising a first flow rate sensor configured to, for each of a plurality of fuel cells, measure a flow rate of a hydrogen-rich reformed gas generated in a hydrogen gas station and supplied to the plurality of fuel cells; and a processor, wherein the processor is configured to calculate an amount of hydrogen consumption in each of the fuel cells based on the flow rate of the reformed gas measured by the first flow rate sensor and power generation conditions of each of the fuel cells, and to carry out hydrogen gas rate accounting based on the amount of hydrogen consumption.

The hydrogen gas rate accounting device calculates a correct amount of hydrogen consumption in each individual home by weighting the reformed gas and the off gas to be adapted to their hydrogen utility values, and gas supplier can carry out gas rate accounting to each individual home according to such a correct amount of hydrogen consumption.

The above and further objects and features of the invention will be more fully apparent from the following detailed description with accompanying drawings.

DETAILED DESCRIPTION OF THE PREFERRED EMBODIMENTS

Hereinafter, first to fifth embodiments of the present invention will be described with reference to the drawings.

Embodiment 1

Figure 1:
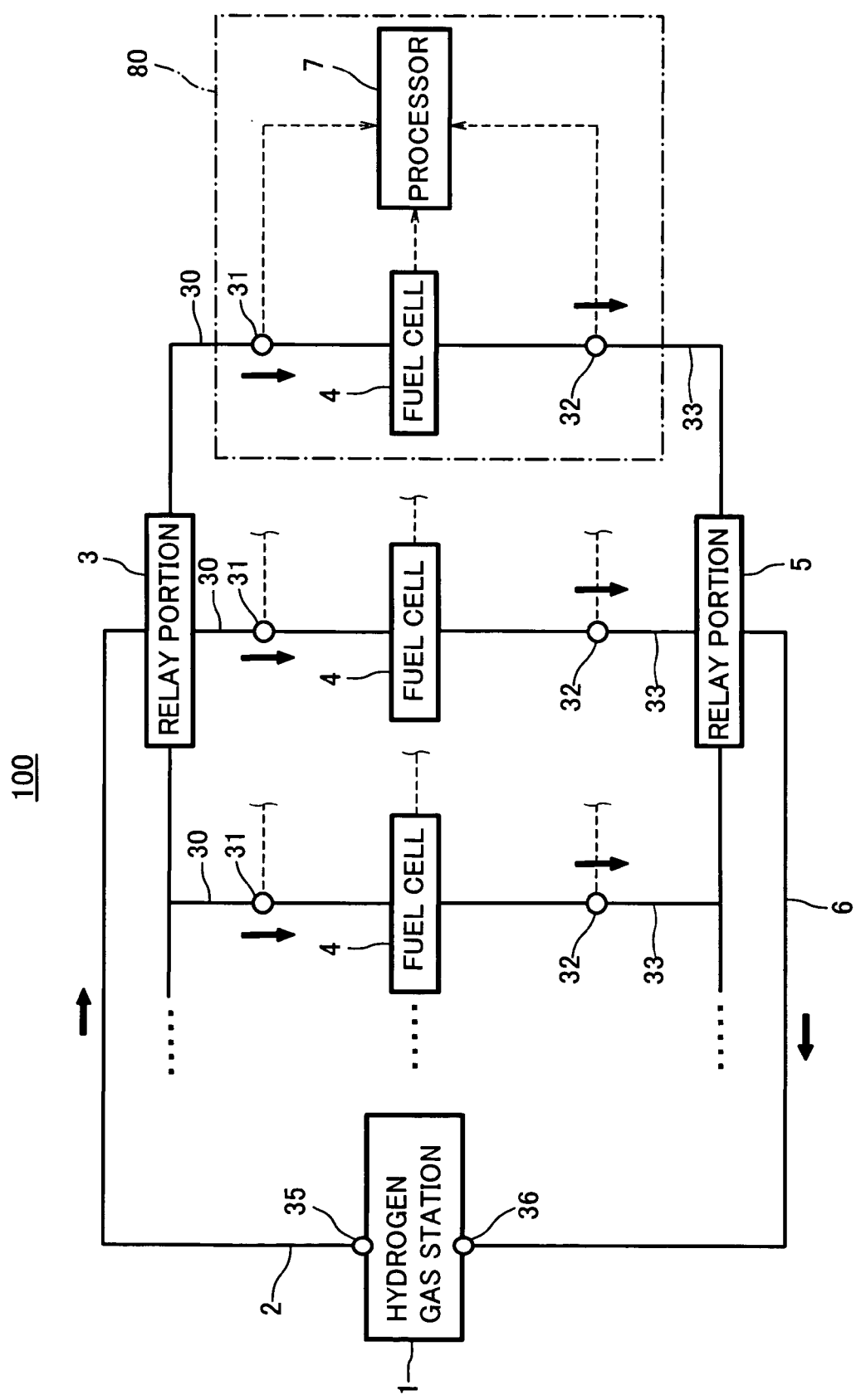
FIG. 1 is a view showing a construction of a distributed fuel cell system according to a first embodiment of the present invention.

FIG. 1 is a view showing a construction of a distributed fuel cell system 100 according to a first embodiment of the present invention. The distributed fuel cell system 100 (hereinafter simply referred to as a fuel cell system 100) according to the first embodiment mainly comprises a hydrogen gas station 1, and a plurality of fuel cells 4 which are gas consumption equipment. The hydrogen gas station 1 is configured to generate a hydrogen-rich reformed gas and to supply the hydrogen-rich reformed gas to the plurality of fuel cells 4. Each fuel cell 4 is configured to consume the reformed gas (hydrogen) to generate electric power and heat. An internal construction of the hydrogen gas station 1 will be described in detail later.

The hydrogen supply system of the fuel cell system 100 includes a gas supply main pipe (gas supply pipe ) 2, a plurality of gas supply sub-pipes (gas supply pipes) 30, and a supply relay portion 3. A gas supply port 35 of the hydrogen gas station 1 and the supply relay portion 3 communicate with each other through the gas supply main pipe 2, and the reformed gas from the hydrogen gas station 1 is guided to the supply relay portion 3 through the gas supply main pipe 2. The plurality of gas supply sub-pipes 30 are connected to fuel gas inlets (not shown) of the fuel cells 4 and the reformed gas supplied from the hydrogen gas station 1 is distributed in appropriate amount and guided to anodes (not shown) of the plurality of fuel cells 4 through the gas supply sub-pipes 30. The supply relay portion 3 serves to collect the gas supply sub-pipes 30 at one point and to convert a gas pressure.

In this construction, the reformed gas from the hydrogen gas station 1 is supplied to the fuel cells 4 through the gas supply main pipe 2 equipped as an infrastructure.

The supply piping system of the reformed gas becomes more complex with an increase in the number of the fuel cells 4 connected to the gas supply pipe 2. For this reason, as shown in FIG. 1, the reformed gas is guided through the gas supply main pipe 2 to the supply relay portion 3 which functions as a gas relay portion and then distributed to fuel gas inlets of the fuel cells 4. It will be appreciated that the number of or capacity of the supply relay portion 3 may be adjusted according to the number of or capacity of the fuel cells 4 for properly supplying the reformed gas from the supply relay portion 3.

The hydrogen recovery system of the fuel cell system 100 includes a plurality of gas recovery sub-pipes (gas recovery pipes) 33, a recovery relay portion 5, and a gas recovery main pipe (gas recovery pipe) 6. The plurality of gas recovery sub-pipes 33 are connected to fuel gas outlets (not shown) of the fuel cells 4, and a recovery gas (hereinafter referred to as an off gas) containing hydrogen unconsumed after power generation reaction in the anodes of the fuel cells 4 is exhausted from fuel gas outlets of the fuel cells 4 outside the fuel cells 4 through the gas recovery sub-pipes 33. The recovery relay portion 5 serves to collect these gas recovery sub-pipes 33 at one point and to convert a gas pressure. A gas recovery port 36 of the hydrogen gas station 1 communicates with the recovery relay portion 5 through the gas recovery main pipe 6, and the off gas exhausted from the fuel gas outlets of the fuel cells 4 and sent to the recovery relay portion 5 returns to the hydrogen gas station 1 through the gas recovery main pipe 6.

In this construction, the off gas exhausted from the fuel gas outlets of the fuel cells 4 returns to the hydrogen gas station 1 through the gas recovery main pipe 6 equipped as an infrastructure.

The recovery piping system of the off gas becomes more complex with an increase in the number of the fuel cells 4 connected to the gas recovery main pipe 6. For this reason, as shown in FIG. 1, the off gases exhausted from the fuel gas outlets of the fuel cells 4 are collected to the recovery relay portion 5 which functions as a gas relay portion and then sent to the gas recovery main pipe 6.

It will be appreciated that the number of or capacity of the recovery relay portion 5 may be adjusted according to the number of or capacity of the fuel cells 4 for properly recovering the off gas from the recovery relay portion 5.

Reformed gas flow rate sensors (e.g., gas meters) 31 are respectively attached to the gas supply sub-pipes 30 and configured to measure flow rates of the reformed gases supplied to the anodes of the fuel cells 4. Likewise, off gas flow rate sensors (e.g., gas meters) 32 are respectively attached to the gas recovery sub-pipes 33 and configured to measure flow rates of the off gases exhausted from the fuel gas outlets of the fuel cells 4.

A processor 7 is configured to receive gas flow rate data output from the reformed gas flow rate sensor 31 and the off gas flow rate sensor 32 and to, for each fuel cell 4, calculate the amount of hydrogen consumed in the power generation operation of the fuel cell 4 from these gas flow rate data. Since there is a difference in hydrogen content between the reformed gas and the off gas and hence there is a difference in utility value of hydrogen between them, the processor 7 calculates the amount of hydrogen consumption by weighting these gas flow rate data so as to correspond to their respective hydrogen gas utility values. Based on the amount of hydrogen consumption, the processor 7 carries out gas rate accounting.

The hydrogen gas rate accounting device 80 in FIG. 1 is comprised of the reformed gas flow rate sensor 31, the off gas flow rate sensor 32, and the processor 7. The hydrogen gas rate accounting device 80 carries out gas rate accounting based on a correct amount of hydrogen consumption for each fuel cell 4.

In addition, the processor 7 is configured to receive operating conditions of the fuel cell 4 such as a power generation amount, a power generation voltage, a current value, etc, from each fuel cell 4, and to estimate the amount of hydrogen consumed during power generation operation in each fuel cell 4 based on these operating conditions. The processor 7 is capable of calculating the above amount of hydrogen consumption from the estimated amount of hydrogen consumption and the gas flow rate data output from the reformed gas flow rate sensor 31.

As a matter of course, the above operation of the processor 7 may be executed by a controller (not shown) capable of properly controlling the operation of each fuel cell 4, or by a controller (referenced to in FIG. 2 by the reference number 34) configured to control operations of internal components within the hydrogen gas station 1 as will be described later.

Subsequently, the internal construction of the hydrogen gas station 1 will be described with reference to the drawings.

Figure 2:
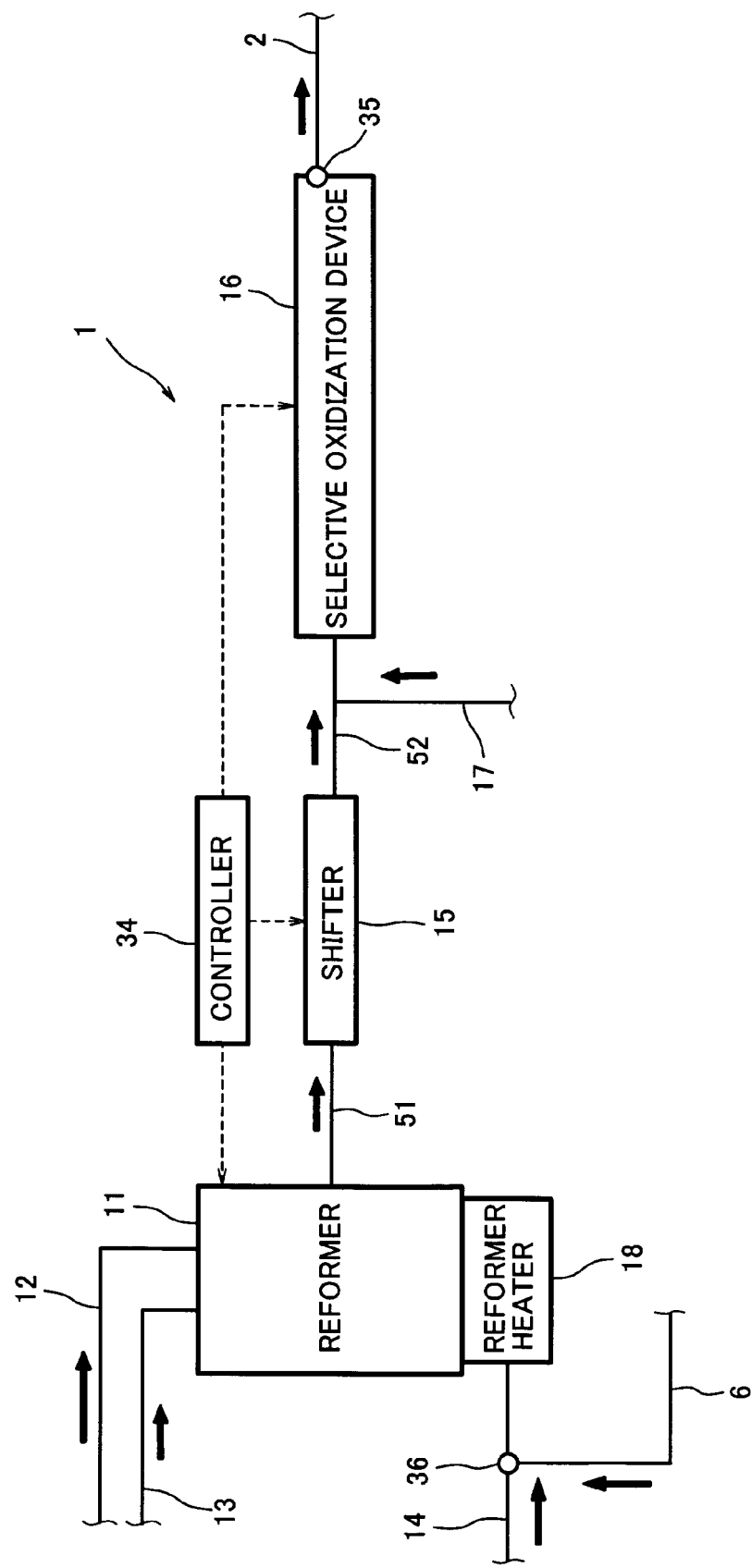
FIG. 2 is a view showing an internal construction of a hydrogen gas station according to the first embodiment.

FIG. 2 is a view showing the internal construction of the hydrogen gas station 1 according to the first embodiment.

The hydrogen gas station 1 comprises, as major components, a reformer 11, a shifter 15, a selective oxidization device 16, and a controller 34. The reformer 11 is configured to conduct steam reforming reaction using a feed gas containing an organic compound such as a hydrocarbon component (e.g., natural gas or LPG), alcohol (e.g., methanol), or a naphtha component, and steam, to generate a reformed gas containing hydrogen as a major component. The shifter 15 is configured to reduce carbon monoxide (CO) contained in the reformed gas supplied from the reformer 11 through shift reaction using the steam. The selective oxidization device 16 is configured to selectively remove the CO from the reformed gas using an oxidizing gas to reduce concentration of the CO in the reformed gas supplied from the shifter 15 to 100 ppm (DRY gas volume standard). The controller 34 is communicatively connected to the components 11, 15, and 16 and configured to properly control operations of the components 11, 15, and 16.

A reforming catalyst body (not shown) carrying ruthenium catalyst on alumina carrier is filled within the reformer 11 and adapted to adjustably promote the reforming reaction. The reformer 11 is equipped with a reformer heater (combustor) 18 that supplies heat required for the reforming reaction to the reforming catalyst body.

The reformer heater 18 has a burner (not shown) configured to combust and consume part of the feed gas or the off gas or a fuel mixture containing the feed gas and the off gas along with air.

The shifter 15 is filled with a shift catalyst body (not shown) formed by, for example, copper and zinc based catalyst, and the selective oxidization device 16 is filled with a selective oxidization catalyst body (not shown) formed by a catalyst containing, for example, a noble metal.

Subsequently, a gas piping system of the hydrogen gas station 1 will be described with reference to FIG. 2.

The gas piping system of the hydrogen gas station 1 comprises a feed gas supply pipe 12 through which the feed gas is guided from a feed gas supply means (not shown) to the reformer 11, a water supply pipe 13 through which ion exchange water required for the reforming reaction is guided from a water supply means (not shown) to the reformer 11, a fuel supply pipe 14 which branches from a position of the feed gas supply pipe 12 and allows part of the feed gas supplied from the feed gas supply means to be guided to the reformer heater 18, a first inner pipe 51 through which the reformed gas from the reformer 11 is guided to the shifter 15, a second inner pipe 52 through which the reformed gas from the shifter 15 is guided to the selective oxidization device 16, and an air supply pipe 17 through which air used for selective oxidization reaction of the reformed gas in the selective oxidization means 16 is guided from an air supply device (not shown) to the selective oxidization device 16.

The gas recovery port 36 is provided in the fuel supply pipe 14 in the gas piping system of the hydrogen gas station 1 and connected to the gas recovery main pipe 6 (see FIG. 1). The off gas flowing through the gas recovery main pipe 6 is guided to the fuel supply pipe 14 through the off gas recovery port 36, and to the reformer heater 18 through a portion of the fuel supply pipe 14 which is located downstream of the off gas recovery port 36 in the flow of the off gas.

The gas supply port 35 is provided in the selective oxidization device 16 of the hydrogen gas station 1 and connected to the gas supply main pipe 2 (see FIG. 1). The reformed gas from the selective oxidization device 16 is guided to the gas supply main pipe 2 through the gas supply port 35.

When the feed gas is, for example, a natural gas, a desulfurization device (not shown) filled with zeolite adsorbent for appropriately removing a sulfur component contained in the natural gas is provided in the feed gas supply pipe 12.

Subsequently, an operation of the above constructed fuel cell system 100 described above will be described with reference to FIGS. 1 and 2. Here, it is assumed that the feed gas equipped as an infrastructure is the natural gas or the city gas, which is easily available.

In the hydrogen gas station 1, the hydrogen-rich reformed gas containing a hydrogen component at a concentration higher than that of the natural gas or the city gas is generated from the natural gas and the steam through the reforming reaction. The reformer 11, the shifter 15, and the selective oxidization device 16 operate appropriately under control of the controller 34 in FIG. 2 to generate the reformed gas, thereby obtaining a reformed gas composition suitable for reaction in the anode of the fuel cell 4. The reformed gas is generated by the existing technique, which will not be further described.

The reformed gas from the hydrogen gas station 1 is supplied to the anodes of the fuel cells 4 through the gas supply main pipe 2, the supply relay portion 3, and the gas supply sub-pipes 30, and consumed therein during power generation of the fuel cells 4. Although not shown, an oxidizing gas is supplied to cathodes (not shown) of the fuel cells 4 and consumed therein during power generation of the fuel cells 4.

During the power generation of the fuel cells 4, a reformed gas is generated in the hydrogen gas station 1 in appropriate amount to be adapted to a total power generation amount which is equal to the sum of power generation amounts in the fuel cells 4. The controller 34 of the hydrogen gas station 1 causes the reformer 11 and the like to operate appropriately. Thereby, the reformed gas is supplied in appropriate amount to the fuel cells 4.

All of hydrogen contained in the reformed gases is not consumed in the power generation operation in the anodes of the fuel cells 4, and the off gases containing hydrogen unconsumed are exhausted from the fuel gas outlets of the fuel cells 4 outside the fuel cells 4. Accordingly, in the first embodiment, the off gases exhausted from the fuel gas outlets of the fuel cells 4 return to the reformer heater 18 (see FIG. 2) of the hydrogen gas station 1 through the gas recovery sub-pipes 33, the recovery relay portion 5, and the gas recovery main pipe 6.

In the hydrogen gas station 1, the off gas is combusted in the reformer heater 18 to generate a combustion gas to be used as a heat source supplied to the reforming catalyst body of the reformer 11. Thereby, the reforming catalyst body appropriately promotes the reforming reaction for generating the reformed gas.

In accordance with the fuel cell system 100 so constructed, the following effects are obtained.

In the polymer electrolyte fuel cells 4 of the first embodiment, power generation efficiency of the fuel cells 4 was approximately forty and several % and heat efficiency thereof was approximately 40% (HHV standard), when using the reformed gas obtained from the reforming reaction of the natural gas or the like.

It will be appreciated that actual power generation efficiency and heat efficiency should be obtained by multiplying numeric values of the above power generation efficiency and heat efficiency by reformed gas generation efficiency, because of expenditure of predetermined energy in the generation of the reformed gas. In view of this, it is important to improve the hydrogen generation efficiency for the purpose of improvement of total energy efficiency.

As matter of course, in the existing fuel cell system in which fuel cells are individually equipped with dedicated reformers, the off gases exhausted from the fuel cells may return to the reformer heaters of the reformers and combusted therein so that the temperatures of the reforming catalyst bodies of the reformers increase.

Nonetheless, in the existing fuel cell system in which each individual reformer generates the reformed gas for each fuel cell, while the amount of heat radiation from the reformer outside the reformer and the amount of heat supply to the reformer (reforming catalyst body) are intended to be thermally balanced, the ratio of the amount of heat radiation to the amount of heat supply increases, thereby resulting in a substantial heat loss. This makes it difficult to improve the hydrogen generation efficiency. While is necessary to adjust the amount of the off gas returning to the reformer according to a variation in demand for hydrogen from the fuel cell, it is difficult to well balance the demand for hydrogen and the amount of the off gas returning to the reformer in the existing fuel cell system. This may possibly reduce hydrogen generation efficiency.

In brief, in the existing fuel cell system in which the fuel cells are individually equipped with the reformers, the efficient use of the off gas may be limited even if the off gases exhausted from the fuel cells are returned to the reformer heaters of the reformers.

On the other hand, in the fuel cell system 100 of the first embodiment which is equipped with the hydrogen gas station 1 configured to generate a large amount of hydrogen demanded by the plurality of fuel cells 4, the ratio of the amount of heat radiation from the reformer 11 outside the reformer 11 to the amount of heat supply to the reformer 11 in generation of hydrogen decreases in the reformer 11 which is large-scaled, as compared to the conventional small-scaled reformers individually equipped for the fuel cells 4. Consequently, the hydrogen generation efficiency can be increased. In order to improve the energy utilization efficiency of the entire fuel cell system 100, a supply system employing centralized reformed gas generation is ideal, in which the reformed gas is generated collectively at one spot of the hydrogen gas station 1, and is then distributed to a number of fuel cells 4.

In addition, in the supply system employing the centralized reformed gas generation, it is possible to offset a variation in demands for the reformed gas from the individual fuel cells 4 or a variation in the amount of the off gases exhausted from the individual fuel cells 4 and returning to the hydrogen gas station 1 and to equalize the amounts of the reformed gas supply and the amounts of the off gas returning to the hydrogen gas station 1 as the number of gas consumption equipment (fuel cells 1) increases. Under this condition, the reformer 11 can operate stably. Consequently, the hydrogen gas generation efficiency can be improved.

In the case of a general city gas infrastructure, gas supplier can construct a gas rate accounting system according to only the amount of gas consumption, without considering gas recovery and by assuming that the amount of gas consumption in the gas consumption equipment (e.g., individual home in the case of home fuel cell) is the amount of gas supplied to the gas consumption equipment.

However, in the fuel cell system 100 shown in the first embodiment, the off gas exhausted from the fuel gas outlet of each of the fuel cells 4 is returned to the hydrogen gas station 1 and used as an effective fuel source to generate the reformed gas in the reformer 11 of the hydrogen gas station 1. So, the existing gas rate accounting system according to the city gas infrastructure is undesirable because a value of the off gas as the fuel source is not estimated.

Accordingly, as described above, the reformed gas flow rate sensor 31 and the off gas flow rate sensor 32, for example, the gas meters, detect the flow rate of the reformed gas and the flow rate of the off gas, respectively. Also, the processor 7 calculates the amount of hydrogen consumed in power generation of each fuel cell 4 from the operating conditions of the fuel cell 4, such as the power generation amount, the power generation voltage, the current value, etc. Thereby, the amount of hydrogen contained in the off gas is calculated.

The gas supplier carries out appropriate accounting to each individual home according to the correct amount of hydrogen consumption which is calculated by the hydrogen gas rate accounting device 80 in FIG. 1 by weighting the reformed gas and the off gas so as to correspond to their hydrogen utility values.

Embodiment 2

In the first embodiment, the off gas exhausted from the fuel gas outlet of each fuel cell 4 is returned to the hydrogen gas station 1 and used therein to generate the reformed gas. How to utilize the off gas is not intended to be limited to this.

In a second embodiment, the off gas is utilized as a heat source of heat energy which is deficient in the fuel cell 4. For example, as shown in FIG. 5, each fuel cell 4 may be equipped with an off gas treatment device 20 capable of combusting part or all of the off gas to generate a high-temperature combustion gas which can re-heat the hot water generated in power generation operation of the fuel cell 4 by heat exchange.

Figure 5:
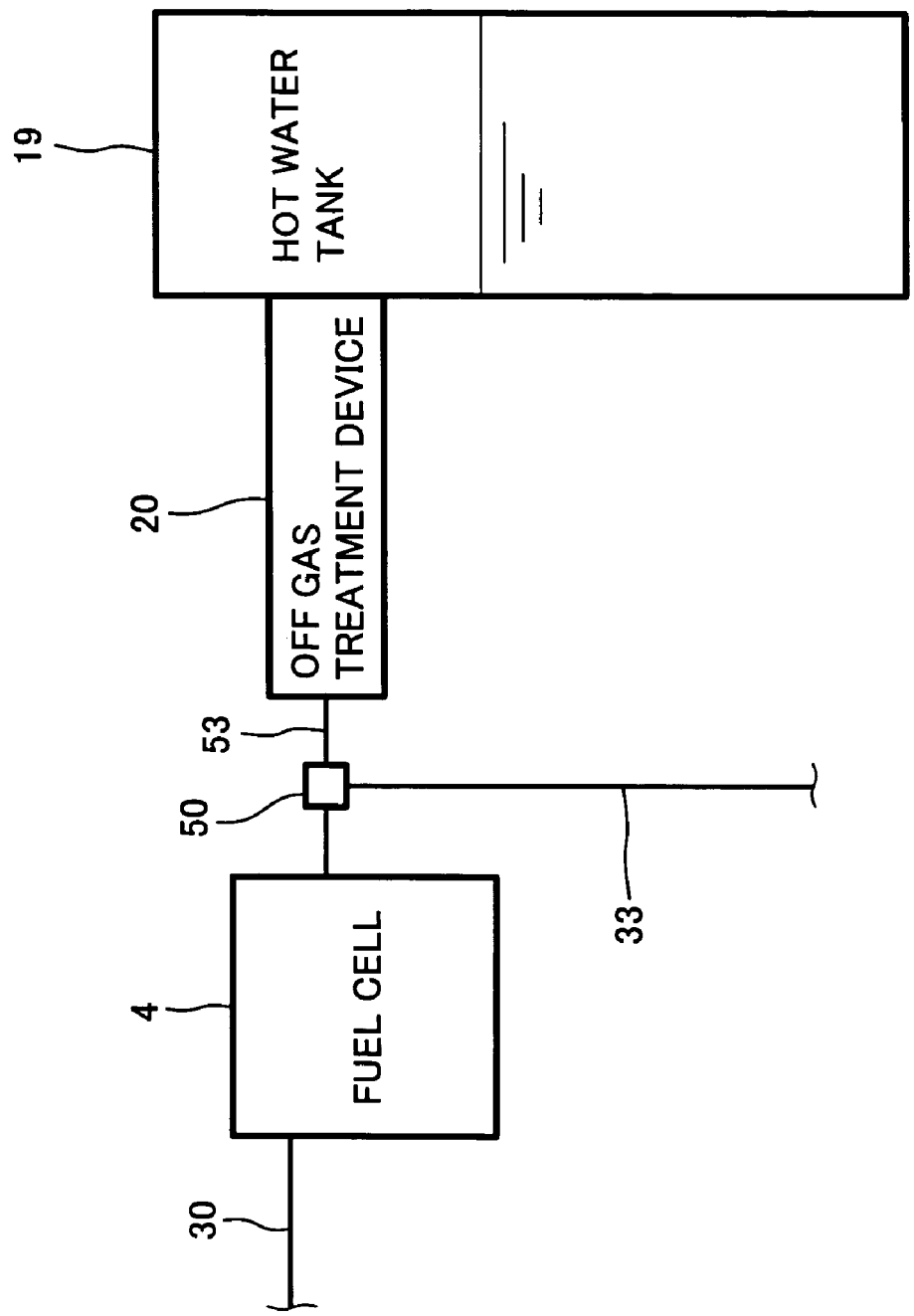
FIG. 5 is a view showing how to utilize an off gas using an off gas treatment device and a hot water tank.

FIG. 5 shows an embodiment in which the off gas is utilized by using the off gas treatment device 20 and a hot water tank 19. The construction and operation in FIG. 5 are substantially identical to those of the first embodiment except for how to utilize the off gas, and description of the construction and operation common to the first and second embodiments is omitted.

Referring to FIG. 5, the hot water tank 19 is equipped for each fuel cell 4 and serves to store predetermined amount of hot water. The off gas treatment device 20 is provided on each hot water tank 19 and comprises a combustor(e.g., burner) configured to combust the off gas and a heat recovery means configured to heat water with heat from the high-temperature combustion gas generated by combustion of the off gas to generate hot water, thereby recovering heat of the combustion gas.

An off gas pipe 53 is provided to allow the fuel gas outlet of the fuel cell 4 to communicate with the off gas treatment device 20 therethrough. Through the off gas pipe 53, the off gas exhausted from the fuel gas outlet of the fuel cell 4 is guided to the off gas treatment device 20.

The gas recovery sub-pipe 33 (see FIG. 1) branches from a position of the off gas pipe 53, and a selector valve 50 is provided at a position where the gas recovery sub-pipe 33 is connected to the off gas pipe 53 and is switch-controlled by a controller (not shown). The selector valve 50 performs switch operation so that the off gas may be sent to the off gas treatment device 20 through the off gas pipe 53 or may be returned to the hydrogen gas station 1 (see FIG. 1) through the gas recovery sub-pipe 33 and the gas recovery main pipe 6 (see FIG. 1).

Hereinbelow, a description will be given of the operation for combusting the off gas in the off gas treatment device 20 equipped on the hot water tank 19 without returning the off gas to the hydrogen gas station 1.

If the hydrogen in the reformed gas is supplied to the anode of the fuel cell 4 at a flow rate of 16 L per minute under the condition in which the fuel cell 4 generates 1 kW of electric power and the hydrogen utilization rate of the fuel cell 4 is 75%, then the amount of hydrogen in the off gas becomes 4 L per minute. By combusting the off gas in the off gas treatment device 20, approximately 200 kJ of heat per hour can be recovered as hot water.

In the existing fuel cell system, the fuel cells are equipped with the similar off gas treatment devices for the purpose of appropriate exhaust of uncombusted off gas and efficient use of the off gas energy.

However, in seasons with high air temperatures, the utilization of the off gas associated with the hot water tank 19 is limited, and the off gas is difficult to efficiently utilize as the fuel source to a desired extent only by the gas treatment in the off gas treatment device 20 connected to the fuel gas outlet of the fuel cell 4.

In accordance with the fuel cell system 100 of the second embodiment, the heat energy of the off gas can be utilized easily and in various ways by using the off gas as the heat source for the reformer 11 of the hydrogen gas station 1 in addition to the utilization of the off gas associated with the hot tank 19.

Embodiment 3

In a first embodiment, the gas supply sub-pipe 30 and the gas recovery sub-pipe 33 are equipped as separate infrastructures. Likewise, the gas supply main pipe 2 and the gas recovery main pipe 6 are installed as separate infrastructures.

However, when the piping is carried out by separately providing the gas supply sub-pipe 30 and the gas recovery sub-pipe 33, this may negatively affect the piping drawing, because of the presence of two kinds of pipes, i.e., the supply pipe and the recovery pipe in each gas consumption equipment.

In order to substantially solve the problem associated with the piping drawing, in the third embodiment, the gas supply sub-pipe 30 and the gas recovery sub-pipe 33 are integral with each other.

Figure 3:
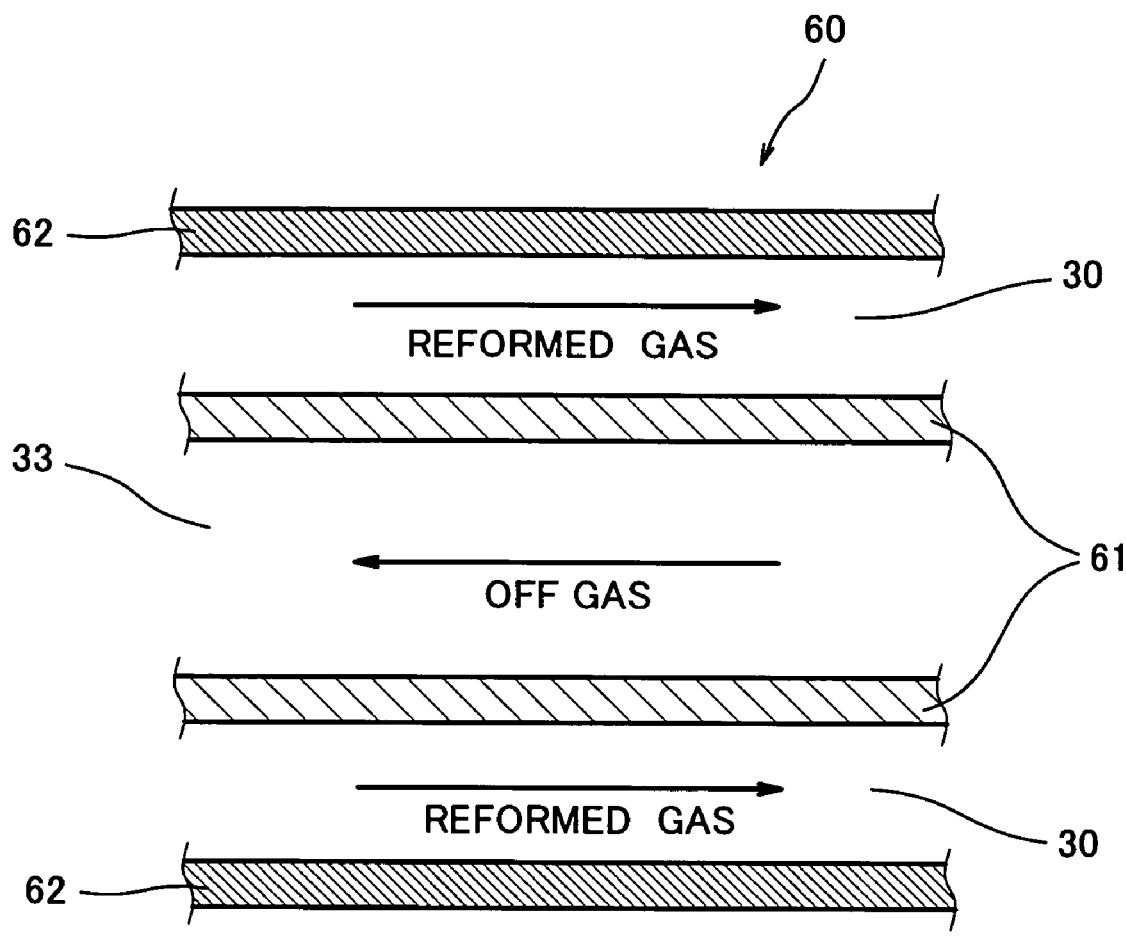
FIG. 3 is a view showing a configuration of piping in which a gas supply sub-pipe is integral with a gas recovery sub-pipe.

FIG. 3 is a view showing a pipe construction in which the gas supply sub-pipe 30 and the gas recovery sub-pipe 33 are integral with each other.

As can be seen from FIG. 3, an integral pipe 60 formed by the gas supply sub-pipe 30 and the gas recovery sub-pipe 33 which are integral with each other, has a double-pipe structure comprised of a cylindrical inner pipe 61 and a cylindrical outer pipe 62 having a diameter larger than that of the inner pipe 61. More specifically, the outer pipe 62 is provided coaxially to enclose the inner pipe 61, thereby forming a predetermined tubular space between them.

Although not shown, suitable pipes are provided to connect the fuel gas inlet to the integral pipe 60 and to connect the fuel gas outlet to the integral pipe 60 so that the reformed gas sent from the integral pipe 60 is guided to the fuel gas inlet of the fuel cell 4 and the off gas exhausted from the fuel gas outlet of the fuel cell 4 is returned to the integral pipe 60.

One of the inner pipe 61 and the outer pipe 62 forms the gas supply sub-pipe 30 and the other forms the gas recovery sub-pipe 33.

Specifically, the reformed gas supplied from the hydrogen gas station 1 is guided to one of an inner space of the inner pipe 61 and the tubular space between the inner pipe 61 and the outer pipe 62, while the off gas exhausted from the fuel gas outlet of the fuel cell 4 is guided to the other.

The double-pipe structure shown in FIG. 3 is desirable, in which the inner pipe 61 forms the gas recovery sub-pipe 33 and the outer pipe 62 forms the gas supply sub-pipe 30. For the purpose of improvement of the heat efficiency of these gases, it is desirable to guide the reformed gas supplied from the hydrogen gas station 1 to the tubular space between the inner pipe 61 and the outer pipe 61 and to guide the off gas exhausted from the fuel gas outlet of the fuel cell 4 to the inner space of the inner pipe 61.

The temperature of the off gas exhausted from the fuel gas outlet of the fuel cell 4 is approximately equal to the operating temperature of the fuel cell 4, and is higher than the temperature of the reformed gas supplied to the fuel gas inlet of the fuel cell 4. For this reason, the reformed gas sent to the fuel gas inlet of the fuel cell 4 through the tubular space between the inner space 61 and the outer pipe 62 can be heated by heat exchange with the off gas exhausted from the fuel gas outlet of the fuel cell 4 through the inner space of the inner pipe 61. In addition, heat radiation from the off gas can be inhibited by the presence of the reformed gas flowing around the off gas. In this manner, heat energy owned by the off gas just after being exhausted from the fuel gas outlet of the fuel 4 can be efficiently utilized.

Embodiment 4

The distributed fuel cell system 100 equipped with the plurality of fuel cells 4 in FIG. 1 has various technical problems to be solved for practical use. Specifically, the off gas exhausted from the fuel gas outlet of the fuel cell 4 has technical problems described below.

First, if the off gas exhausted from the fuel gas outlet of the fuel cell 4 is returned to the hydrogen gas station 1 through a long distance, a pressure loss of the off gas increases and thereby gas pressure of the off gas becomes lower.

Second, if the gas pressure of the off gas in the gas recovery sub-pipe 33 connected to the fuel gas outlet of the fuel cell 4 varies from the fuel cell 4 to the fuel cell 4, then the off gas flows from the gas recovery sub-pipe 33 under a high gas pressure condition toward the gas recovery sub-pipe 33 under a low gas pressure condition through the recovery relay portion 5. In worse case, the off gas flows back to the anode of the fuel cell 4 connected to the gas recovery sub-pipe 33 under the low gas pressure condition.

Third, if unpredictable situations such as blackout or failure of the off gas under-pressure feeding system, take place, and a gas pressure increasing device malfunctions, the gas pressure of the off gas is not obtained stably. In that case, the off gas may flow back.

Fourth, if air (oxidizing gas) existing in the cathode of the fuel cell 4 flows to the anode of the fuel cell 4 through an electrolyte membrane, abnormal combustion of hydrogen may be induced by mixing of the off gas containing hydrogen and the oxidizing gas.

Fifth, the off gas exhausted from the fuel gas outlet of the fuel cell 4 contains a large amount of steam and its dew point is near the operating temperature of the fuel cell 4, and therefore, if a large amount of off gas is exhausted to the gas recovery sun pipe 33 at one time, the temperature of the off gas decreases while flowing in the gas recovery sub-pipe 33 and the steam in the off gas condenses to form water droplets, which may clog the gas recovery sub-pipe 33.

Figure 6:
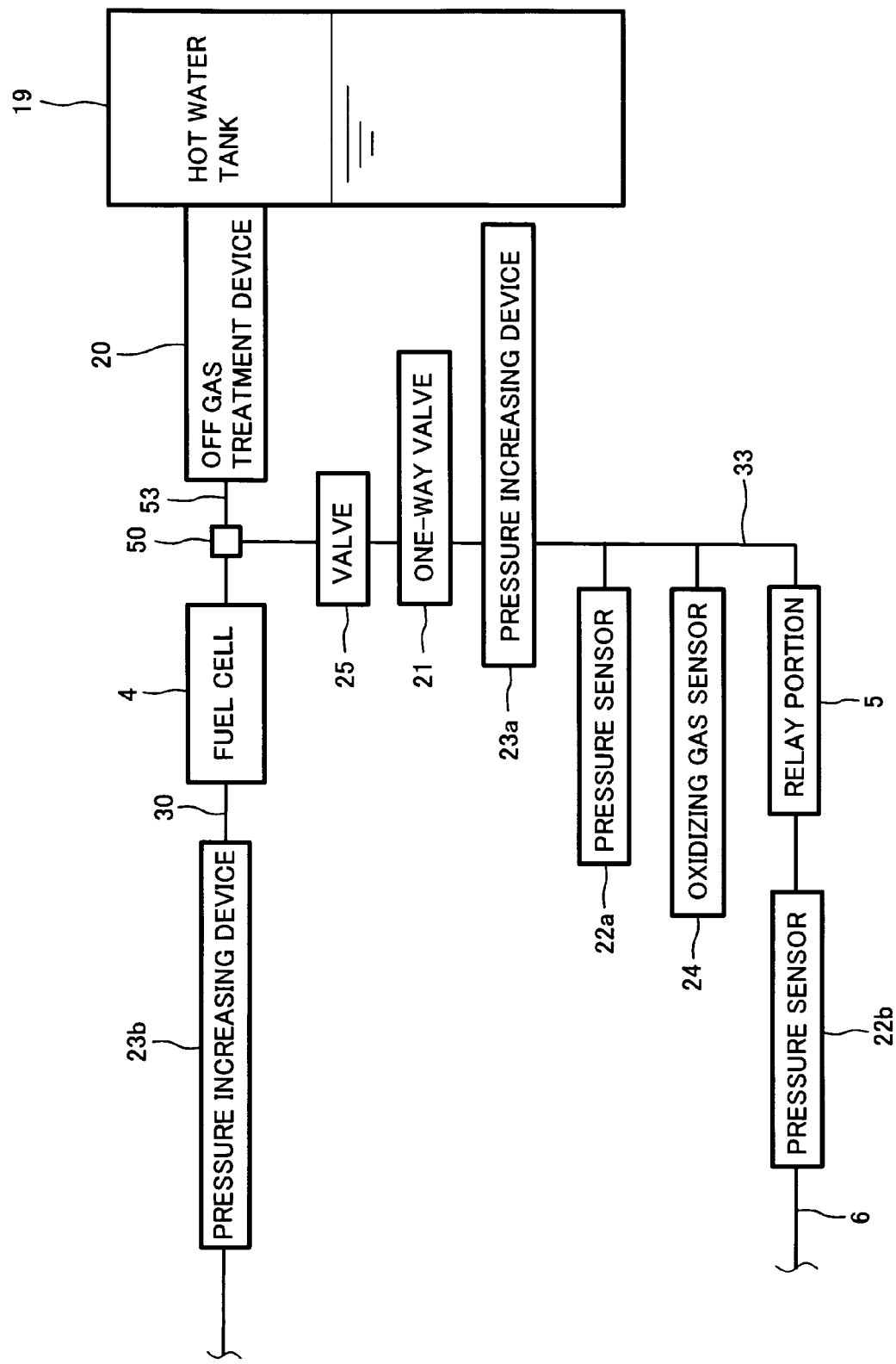
FIG. 6 is a view showing a configuration capable of solving a technical problem associated with an off gas exhausted from a fuel gas outlet of a fuel cell.

Accordingly, in order to appropriately deal with the above described first to fourth problems, as shown in FIG. 6, various sensors, a pressure increasing device, and various valves are provided in the gas recovery sub-pipe 33 through which the off gas exhausted from the fuel gas outlet of the fuel cell 4 is guided to the recovery relay portion 5.

As shown in FIG. 6, a valve (e.g., electromagnetic valve) 25, a one-way valve (anti-backflow device) 21, a first pressure increasing device (e.g., booster) 23a, a first pressure sensor 22a, and a magnetic oxidizing gas sensor 24 are arranged in this order on downstream side of the selector valve 50 in the flow of the off gas and on upstream side of the recovery relay portion 5. The valve 25 serves to open and close the gas recovery sub-pipe 33. The one-way valve 21 is adapted to inhibit back flow of the off gas exhausted from the fuel gas outlet of the fuel cell 4. The first pressure increasing device 23a is adapted to increase the gas pressure of the off gas in the gas recovery sub-pipe 33. The first pressure sensor 22a is configured to measure the gas pressure of the off gas in the gas recovery sub-pipe 33. The oxidizing gas sensor 24 is configured to measure a concentration of the oxidizing gas in the off gas in the gas recovery sub-pipe 33.

A second pressure sensor 22b is attached to the gas recovery main pipe 6 connected to the recovery relay portion 5 to measure the gas pressure of the off gas in the gas recovery main pipe 6.

While the first pressure increasing device 23a is disposed in the gas recovery sub-pipe 33, a second pressure increasing device 23b may alternatively be disposed in the gas supply sub-pipe 30 (see FIG. 1) as shown in FIG. 1. Also, while the one-way valve 21 is provided in the gas recovery sub-pipe 33, the back flow of the off gas in the gas recovery main pipe 6 may be inhibited by providing a similar one-way valve (not shown) in the gas recovery main pipe 6.

The controller (not shown) properly controls opening and closing of the valve 25, the pressure increasing operation of the first pressure increasing device 23a, and the pressure increasing operation of the second pressure increasing device 23b based on detection signals from the first and second pressure sensors 22a and 22b, and the oxidizing gas sensor 24.

Thus, by providing the first or second pressure increasing devices 23a or 23b in the gas supply sub-pipe 30 or the gas recovery sub-pipe 33, the gas pressure of the off gas is kept at a predetermined preset value. The set value of the gas pressure of the off gas is set for each fuel cell 4 to enable the off gas to flow smoothly within the gas recovery sub-pipe 33. Herein, the gas pressure of the off gas in the gas recovery sub-pipe 33 is continuously monitored by the first pressure sensor 22a.

By providing the second pressure sensor 22b in the gas recovery main pipe 6 connected to the recovery relay portion 5, the differential pressure between the first and second pressure sensors 22a and 22b can be measured. In addition, by properly controlling the differential pressure, the off gas can be returned to the hydrogen gas station 1 reliably and stably. Further, a plurality of pressure sensors provided for each fuel cell 4 may be operated in cooperation with each other, and the differential pressure between the pressure sensors may be measured and properly controlled to allow the off gas to be returned to the hydrogen gas station 1 stably.

In addition, a lower limit value of the gas pressure measured by the first pressure sensor 22a may be set, and when the value of the gas pressure measured by the first pressure sensor 22a is lower than the lower limit value, the valve 25 may be closed. In other words, the valve 25 serves to close the gas recovery sub-pipe 33 urgently in response to reduction of the gas pressure in an unpredictable situation.

If the first pressure increasing device 23a connected to the fuel cell 4 fails in an unpredictable situation, and thereby a proper gas pressure of the off gas cannot be obtained, the valve 25 is closed. That is, the valve 25 can inhibit the back flow of the off gas exhausted from the fuel cell 4, as well as the one-way valve 21.

When the valve 25 is closed to stop exhausting the off gas from the fuel gas outlet of the fuel cell 4 to the gas recovery sub-pipe 33, it becomes impossible to continue supplying the reformed gas to the fuel gas inlet of the fuel cell 1 after that. So, when the value of the pressure measured by the first pressure sensor 22a is lower than the lower limit value, the valve 25 is closed and power generation operation of the fuel cell 4 stops.

In order to avoid the stop of the power generation operation of the fuel cell 4, as shown in FIG. 6, the off gas treatment device 20 is equipped on the hot water tank 19 to treat the off gas exhausted from the fuel gas outlet of the fuel cell 4. The off gas exhausted from the fuel gas outlet of the fuel cell 4 can be guided to the off gas treatment device 20 based on the operation of the selector valve 50.

By providing the oxidizing gas sensor 24 in the gas recovery sub-pipe 33 to measure a concentration of the oxidizing gas in the off gas, it becomes possible to reliably detect whether or not the off gas contains the oxidizing gas.

In addition, in preparation for the event that the oxidizing gas is mixed into the off gas in the gas recovery sub-pipe 33 in an unpredictable situation, a reference value of an oxidizing gas concentration (1%) corresponding to a lower limit value of a combustible range of hydrogen is set as the upper limit of the concentration of the oxidizing gas capable of being contained in the off gas. If the oxidizing gas which is above the reference value is detected by the oxidizing gas sensor 24, the controller causes the valve 25 to close, thereby automatically stopping-introduction of the off gas into the gas recovery sub-pipe 33. As a result, it is possible to avoid abnormal combustion of hydrogen caused by mixing of the hydrogen and the oxidizing gas in the gas recovery sub-pipe 33.

Figure 7:
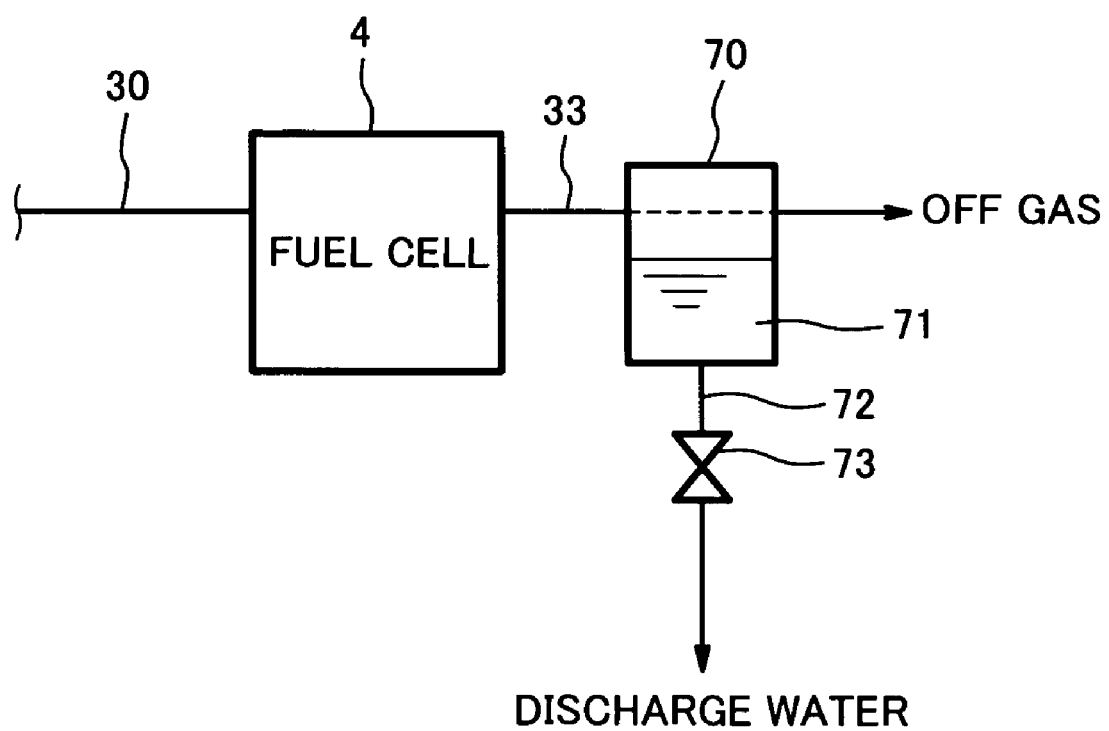
FIG. 7 is a view showing another configuration capable of solving a technical problem associated with the off gas exhausted from the fuel gas exhaust port of the fuel cell.

In order to deal with the above mentioned fifth problem, as shown in FIG. 7, a condenser 70 is provided in the gas recovery sub-pipe 33 connected to the fuel gas outlet of the fuel cell 4 to promote condensation of steam contained in the off gas. By promoting condensation of the steam contained in the off gas, a dew point of the off gas decreases. As a result, it is possible to inhibit formation of the water droplets from the off gas in the gas recovery sub-pipe 31, which may clog the gas recovery sub-pipe 33.

The condenser 70 includes a water reservoir 71 which reserves condensed water generated from the steam contained in the off gas, a water discharge pipe 72 communicating with the water reservoir 71, and a water discharge valve 73 provided in the water discharge pipe 72. When the condensed water of a predetermined amount or more is reserved in the water reservoir 71, the water discharge valve 73 is opened, thereby discharging the condensed water reserved in the water reservoir 71 outside the water reservoir 71 through the water discharge pipe 72.

Likewise, the temperature of the off gas collected into the recovery relay portion 5 may decrease, and the steam contained in the off gas may condense to form water droplets which clog the pipes in the vicinity of the recovery relay portion 5. To avoid this, a condenser similar to the condenser 70 in FIG. 7 may be provided within the recovery relay portion 5 or in the gas recovery main pipe 6 communicating with the recovery relay portion 5.

These condensers may alternatively be provided in other suitable locations other than the gas recovery sub-pipe 33 or the gas recovery main pipe 6. In order to obtain the above described effect, it is necessary to provide the condensers at suitable locations at least downstream of the fuel gas outlet (outlet of the off gas) of the fuel cell 4. Nonetheless, it is desirable to avoid effect of water condensation as early as possible by positioning the condensers at upstream locations in the flow of the off gas which are as close to the fuel gas outlet as possible, in a region where the steam may possibly condense to form water droplets.

Embodiment 5

Figure 4:
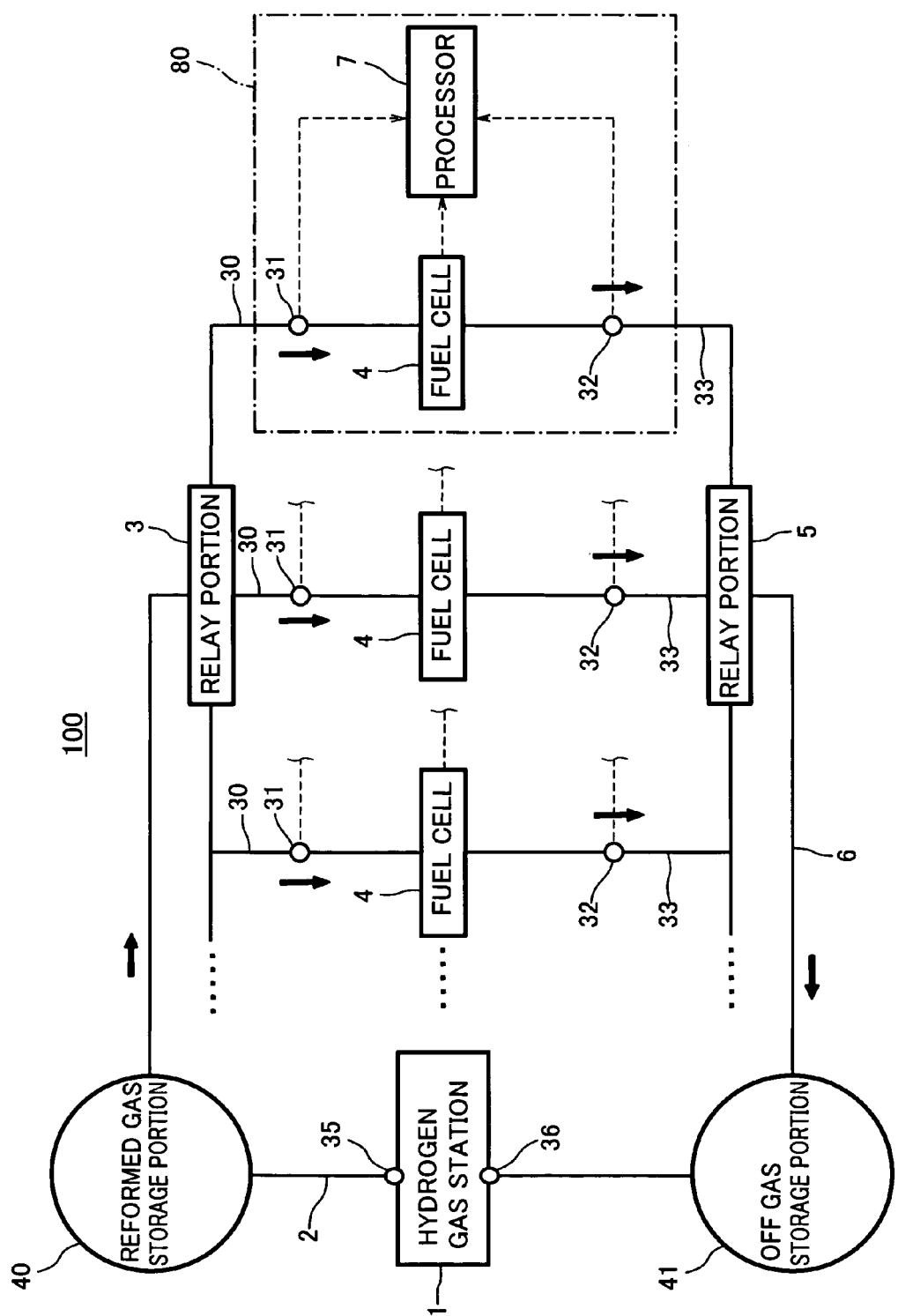
FIG. 4 is a view showing a construction of a distributed fuel cell system according to a fifth embodiment of the present invention.

FIG. 4 is a view of a construction of a distributed fuel cell system 100 according to a fifth embodiment of the present invention.

In the fifth embodiment, a reformed gas storage portion 40 is provided in the gas supply main pipe 2 and configured to serve as a buffer which temporarily stores the reformed gas supplied from the hydrogen gas station 1 and guided toward the supply relay portion 3, and an off gas storage portion 41 is provided in the gas recovery main pipe 6 and configured to serve as a buffer which temporarily stores the off gas when the off gas exhausted from the fuel gas outlet of the fuel cell 4 and collected into the recovery relay portion 5 is returned to the hydrogen gas station 1.

More specifically, the reformed gas storage portion 40 and the off gas storage portion 41 serve to store and exhaust gases, for example, a high-pressure gas storage tank, or a tank made of hydrogen occluding alloy. Since the construction and operation of the fuel cell system 100 of the fifth embodiment is substantially identical to those of the fuel cell system 100 of the first embodiment except for the reformed gas storage portion 40 and the off gas storage portion 41, description of the construction and operation common to the fuel cell system 100 is omitted The provision of the reformed gas storage portion 40 and the off gas storage portion 41 allow the reformed gas to be stably supplied and the off gas to be stably recovered to be adapted to power generation amount of each fuel cell 4. Consequently, convenience of the distributed fuel cell system 100 of the fifth embodiment is improved, and operation efficiency of the fuel cell system 100 is improved.

Numerous modifications and alternative embodiments of the invention will be apparent to those skilled in the art in the light of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A fuel cell system comprising:
    a hydrogen gas station configured to generate a hydrogen-rich reformed gas through a reforming reaction of an organic compound;
    a plurality of fuel cells each of which is configured to generate electric power using the reformed gas supplied from said hydrogen gas station;
    a gas supply pipe through which the reformed gas is guided from said hydrogen gas station to said fuel cells;
    a gas recovery pipe through which an off gas containing unconsumed hydrogen from said fuel cells is guided to said hydrogen gas station; and
    a double-walled pipe comprised of a tubular inner pipe and a tubular outer pipe enclosing the inner pipe, wherein one of the inner pipe and the outer pipe forms said gas supply pipe and the other of the inner pipe and the outer pipe forms said gas recovery pipe.

2. The fuel cell system according to claim 1, wherein said inner pipe forms said gas recovery pipe and said outer pipe forms said gas supply pipe.

3. The fuel cell system according to claim 1, further comprising:
    a reformed gas storage portion provided in said gas supply pipe and configured to store the reformed gas supplied from said hydrogen gas station.

4. The fuel cell system according to claim 1, wherein said hydrogen gas station includes a first combustor configured to supply heat required for the reforming reaction, and said first combustor is configured to combust the off gas to generate the heat.

5. The fuel cell system according to claim 1, further comprising:
    a pressure increasing device provided in said gas supply pipe and configured to adjust a gas pressure of the off gas.

6. The fuel cell system according to claim 1, wherein said gas recovery pipe is comprised of a plurality of gas recovery sub-pipes respectively connected to said fuel cells, and a gas recovery main pipe into which said gas recovery sub-pipes are collected, said gas recovery main pipe being connected to said hydrogen gas station.

7. A fuel cell system comprising:
    a hydrogen gas station configured to generate a hydrogen-rich reformed gas through a reforming reaction of an organic compound;
    a plurality of fuel cells each of which is configured to generate electric power using the reformed gas supplied from said hydrogen gas station;
    a gas supply pipe through which the reformed gas is guided from said hydrogen gas station to said fuel cells;
    a gas recovery pipe through which an off gas containing unconsumed hydrogen from said fuel cells is guided to said hydrogen gas station; and
    an off gas storage portion provided in said gas recovery pipe and configured to store the off gas exhausted from said fuel cells.

8. A fuel cell system comprising:
    a hydrogen gas station configured to generate a hydrogen-rich reformed gas through a reforming reaction of an organic compound;
    a plurality of fuel cells each of which is configured to generate electric power using the reformed gas supplied from said hydrogen gas station;
    a gas supply pipe through which the reformed gas is guided from said hydrogen gas station to said fuel cells;
    a gas recovery pipe through which an off gas containing unconsumed hydrogen from said fuel cells is guided to said hydrogen gas station; and
    a combustor connected to each of said fuel cells, and configured to combust the off gas from each of said fuel cells.

9. A fuel cell system comprising:
    a hydrogen gas station configured to generate a hydrogen-rich reformed gas through a reforming reaction of an organic compound;
    a plurality of fuel cells each of which is configured to generate electric power using the reformed gas supplied from said hydrogen gas station;
    a gas supply pipe through which the reformed gas is guided from said hydrogen gas station to said fuel cells;
    a gas recovery pipe through which an off gas containing unconsumed hydrogen from said fuel cells is guided to said hydrogen gas station; and
    a first pressure increasing device provided in said gas recovery pipe and configured to adjust a gas pressure of the off gas in said gas recovery pipe.

10. A fuel cell system comprising:
    a hydrogen gas station configured to generate a hydrogen-rich reformed gas through a reforming reaction of an organic compound;
    a plurality of fuel cells each of which is configured to generate electric power using the reformed gas supplied from said hydrogen gas station;
    a gas supply pipe through which the reformed gas is guided from said hydrogen gas station to said fuel cells;
    a gas recovery pipe through which an off gas containing unconsumed hydrogen from said fuel cells is guided to said hydrogen gas station; and
    a condenser provided on a downstream side of an off gas outlet of each of said fuel cells in a flow of the off gas and configured to condense steam contained in the off gas.

11. A fuel cell system comprising:
    a hydrogen gas station configured to generate a hydrogen-rich reformed gas through a reforming reaction of an organic compound;
    a plurality of fuel cells each of which is configured to generate electric power using the reformed gas supplied from said hydrogen gas station;
    a gas supply pipe through which the reformed gas is guided from said hydrogen gas station to said fuel cells;
    a gas recovery pipe through which an off gas containing unconsumed hydrogen from said fuel cells is guided to said hydrogen gas station, wherein said gas recovery pipe is comprised of a plurality of gas recovery sub-pipes respectively connected to said fuel cells, and a gas recovery main pipe into which said gas recovery sub-pipes are collected, said gas recovery main pipe being connected to said hydrogen gas station; and
    an anti-backflow device provided in at least one of said gas recovery sub-pipe and said gas recovery main pipe and configured to inhibit backflow of the off gas.

12. The fuel cell system according to claim 11, wherein said anti-backflow device is a one-way valve.

13. A fuel cell system comprising:
    a hydrogen gas station configured to generate a hydrogen-rich reformed gas through a reforming reaction of an organic compound;
    a plurality of fuel cells each of which is configured to generate electric power using the reformed gas supplied from said hydrogen gas station;
    a gas supply pipe through which the reformed gas is guided from said hydrogen gas station to said fuel cells;

a gas recovery pipe through which an off gas containing unconsumed hydrogen from said fuel cells is guided to said hydrogen gas station, wherein said gas recovery pipe is comprised of a plurality of gas recovery sub-pipes respectively connected to said fuel cells, and a gas recovery main pipe into which said gas recovery sub-pipes are collected, said gas recovery main pipe being connected to said hydrogen gas station; and a first pressure sensor provided in said gas recovery sub-pipe and configured to measure a gas pressure of the off gas in said gas recovery sub-pipe.

14. The fuel cell system according to claim 13, further comprising:

a first pressure increasing device provided in said gas recovery sub-pipe and configured to adjust a gas pressure of the off gas in said gas recovery sub-pipe, said first pressure increasing device being configured to adjust a value of the gas pressure obtained from said first pressure sensor to a predetermined value.

15. The fuel cell system according to claim 14, further comprising:

a second pressure sensor provided in said gas recovery main pipe and configured to measure a gas pressure of the off gas in said gas recovery main pipe, said first pressure increasing device being configured to adjust a differential pressure between the value of the gas pressure obtained from said first pressure sensor and a value of the gas pressure obtained from said second pressure sensor to a predetermined value.

16. The fuel cell system according to claim 13, further comprising:

a gas pipe valve provided in said gas recovery sub-pipe and configured to open and close said gas recovery sub-pipe, said gas pipe valve being configured to be closed when the value of the gas pressure obtained from said first pressure sensor is not more than a predetermined value.

17. The fuel cell system according to claim 16, further comprising:

a combustor connected to each of said fuel cells, and configured to combust the off gas when said gas pipe valve is closed.

18. A fuel cell system comprising:

a hydrogen gas station configured to generate a hydrogen-rich reformed gas through a reforming reaction of an organic compound;

a plurality of fuel cells each of which is configured to generate electric power using the reformed gas supplied from said hydrogen gas station;

a gas supply pipe through which the reformed gas is guided from said hydrogen gas station to said fuel cells;

a gas recovery pipe through which an off gas containing unconsumed hydrogen from said fuel cells is guided to said hydrogen gas station, wherein said gas recovery pipe is comprised of a plurality of gas recovery sub-pipes respectively connected to said fuel cells, and a gas recovery main pipe into which said gas recovery sub-pipes are collected, said gas recovery main pipe being connected to said hydrogen gas station; and an oxidizing gas sensor provided in said gas recovery sub-pipe and configured to measure a concentration of the oxidizing gas contained in the off gas in said gas recovery sub-pipe.

19. The fuel cell system according to claim 18, further comprising:

a gas pipe valve provided in said gas recovery sub-pipe and configured to open and close said gas recovery sub-pipe, said gas pipe valve being configured to be closed when said oxidizing gas sensor detects an oxidizing gas having a predetermined concentration or higher.

20. The fuel cell system according to claim 19, wherein an operation of said fuel cell is stopped when said oxidizing gas sensor detects the oxidizing gas having the predetermined concentration or higher.

21. A fuel cell system comprising:

a hydrogen gas station configured to generate a hydrogen-rich reformed gas through a reforming reaction of an organic compound;

a plurality of fuel cells each of which is configured to generate electric power using the reformed gas supplied from said hydrogen gas station;

a gas supply pipe through which the reformed gas is guided from said hydrogen gas station to said fuel cells;

a gas recovery pipe through which an off gas containing unconsumed hydrogen from said fuel cells is guided to said hydrogen gas station;

a first flow rate sensor provided in said gas supply pipe and configured to measure a flow rate of the reformed gas flowing in said gas supply pipe;

a second flow rate sensor provided in said gas recovery pipe and configured to measure a flow rate of the off gas flowing in said gas recovery pipe; and a processor, wherein said processor is configured to calculate an amount of hydrogen consumption in each of said fuel cells based on the flow rate of the reformed gas measured by said first flow rate sensor and the flow rate of the off gas measured by said second flow rate sensor.

22. The fuel cell system according to claim 21, wherein said processor is configured to carry out hydrogen gas rate accounting based on the amount of hydrogen consumption in said fuel cell.

23. A fuel cell system comprising:

a hydrogen gas station configured to generate a hydrogen-rich reformed gas through a reforming reaction of an organic compound;

a plurality of fuel cells each of which is configured to generate electric power using the reformed gas supplied from said hydrogen gas station;

a gas supply pipe through which the reformed gas is guided from said hydrogen gas station to said fuel cells;

a gas recovery pipe through which an off gas containing unconsumed hydrogen from said fuel cells is guided to said hydrogen gas station;

a first flow rate sensor provided in said gas supply pipe and configured to measure a flow rate of the reformed gas flowing in said gas supply pipe; and a processor, wherein said processor is configured to calculate an amount of hydrogen consumption in each of said fuel cells based on the flow rate of the reformed gas measured by said first flow rate sensor and power generation conditions of said fuel cell.

24. The fuel cell system according to claim 23, wherein said processor is configured to carry out hydrogen gas rate accounting based on the amount of hydrogen consumption in said fuel cell.

\* \* \* \* \*